Feb. 25, 1930.  B. W. KADEL  1,748,294
METHOD OF MANUFACTURING KEYS FOR RAILWAY DRAFT RIGGING
Filed Nov. 30, 1923
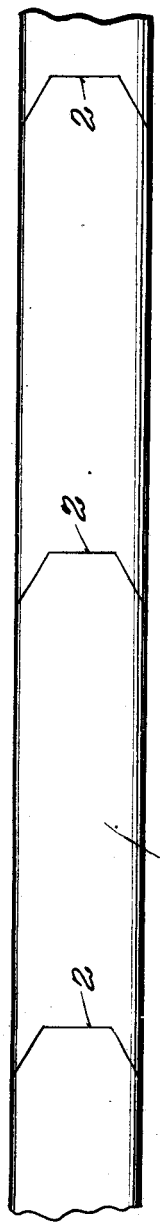
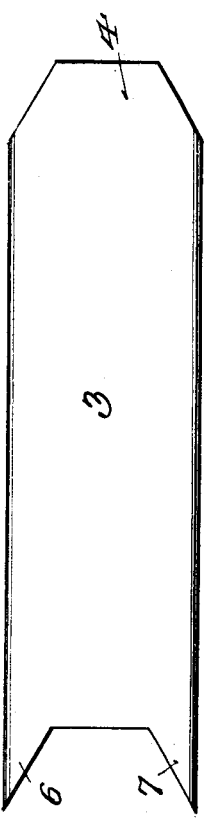
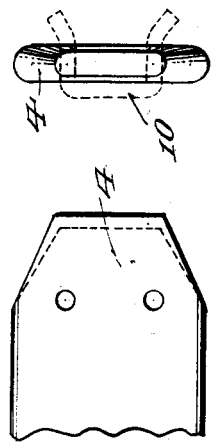
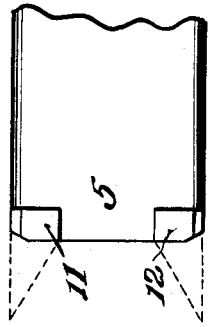
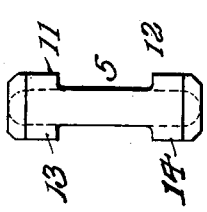
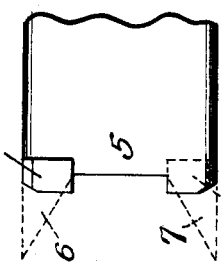
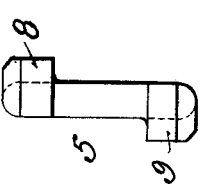
Inventor
Byers W. Kadel
Ernest F. Mechlin
By his Attorney Patented Feb. 25, 1930

1,748,294

UNITED STATES PATENT OFFICE

BYERS W. KADEL, OF BALTIMORE, MARYLAND, ASSIGNOR, BY MESNE ASSIGNMENTS, TO THE SYMINGTON COMPANY, A CORPORATION OF MARYLAND

METHOD OF MANUFACTURING KEYS FOR RAILWAY DRAFT RIGGING

Application filed November 30, 1923. Serial No. 677,730.

The invention relates to keys for railway draft rigging and more particularly to a process of forming keys from a bar or strip of metal by a combined shearing and shaping process.

To this end, the principal object of the invention, broadly stated, involves the economical production of a plurality of keys from a suitable bar of relatively flat and rounded edge material by cutting or shearing the bar into suitable lengths corresponding substantially to the lengths of the keys desired with the respective lines of shear arranged to provide the proper amount of metal in the adjoining ends of the keys blanks, and shaping said adjoining ends to form the points and heads of the respective keys, said operations requiring a minimum amount of labor and involving no waste of metal.

Another object of the invention is to produce a method of manufacturing draft gear keys of effecting a multiple shearing of a suitable bar of key stock, said stock being cut into lengths by means of a V-shaped punch which acts to roughly form the point of the key and leave projecting wings or extensions on the succeeding or adjacent key, which extensions are subsequently upset to form projections from either one or both sides at the head of the key. The method of manufacture also includes the shaping of the roughly pointed end to finished size by swaging and shaping of the wing-like extensions to form retaining lugs of sufficient size at the head of the key to effectively maintain the same in position under service conditions.

These and other objects of the invention will be readily apparent from the detailed description of the various steps of the process, particularly when taken in connection with the accompanying drawings wherein is illustrated in the several views the appearance of the key during the stages of its manufacture.

In the drawings:

Figure 1 is a plan view of a bar of key stock showing the line of cut or shear producing the adjoining key blanks.

Figure 2 is a cross section of said bar.

Figure 3 is a detached plan view of one of the key blanks.

Figure 4 is a detail plan view of the finished point end of the key after swaging, said view showing in dotted lines the line of cut or shear of the blank.

Figure 5 is an end view of the point end of the key shown in Figure 4, a key retaining cotter being shown in dotted lines.

Figure 6 is a detail plan view of the finished head end of the key, illustrating in dotted lines the shape of the wing-like extensions as formed by the shear punch.

Figure 7 is an end view of the key head shown in Figure 6, in which the retaining lugs project from opposite sides of the key.

Figure 8 is a detail plan view of a modified construction of key head in which the wing-like extensions are shaped to form projections disposed upon both sides of the key.

Figure 9 is an end view thereof.

Referring to the drawings in which similar reference characters designate correspond parts in the several views, the numeral 1 indicates a bar of key stock comprising a flat metal strip of uniform cross sectional area and having its opposite side edges preferably rounded. The bar is cut or sheared at spaced points corresponding to the lengths of keys desired, the shear lines being designated by the numeral 2 and extending transversely of the bar as clearly shown in Figure 1. The shape of the shear or cut is V-like, the sides of the V, however, terminating short of their usual point junction in order to more closely follow the usual contour of the point end of a draft key. A plurality of cuts are preferably made at the same time by means of a suitable shear punching mechanism, the several punches of which are substantially V-shaped as aforesaid for cutting the bar into a plurality of kep blanks 3, each being of the shape shown in Figure 3.

The lines of shear which produce the adjacent key blanks are each designed so that the metal upon each side of the line of shear becomes available for use in the completing of the keys. It will be observed that the point end of the key blank is cut relatively short so as to permit the metal to be swaged to the desirable tapered shape and extended to the requisite length, there being, however, no cutting away or loss of metal as the result of this operation. The angular portions of the shear line intersecting the opposite edges of the bar produces the point end of the key and at the same time bifurcates the head end of the adjacent blank without loss of metal. Suitable openings are formed in the point end of the key to receive the cotter 10 shown in dotted lines in Figure 5.

The metal of the bar lying on the opposite side of the line of shear forming the point end is utilized in the formation of projections or lugs providing the head 5 of the key, said metal comprising initially the wing-like extensions 6 and 7 of the bifurcated end of the blank. As shown in Figures 6 and 7, the extensions are upset by any suitable method to provide the lugs or projections 8 and 9 extending respectively from opposite sides of the key. The projections 8 and 9 extend beyond the head end of the body portion of the key and provide a part of the retaining means under service conditions of which the usual cotter provides the other.

In Figures 8 and 9 the wing-like extensions are worked to the shape shown and form the projections or lugs 11 and 12 upon one side of the key and projections or lugs 13 and 14 upon the other side of the key. The several lugs or projections are disposed substantially flush with the head of the key blank as shown.

Draft keys constructed in accordance with the present invention can be economically manufactured in large quantities with no waste of material, the key stock chosen being a rounded edge bar and the shearing, swaging and upsetting operations being accomplished with a minimum expenditure of labor. It will also be observed that the retaining lugs on the head end of the key are advantageously located adjacent the sides thereof and that their location is determined by providing the usual point on the key and without sacrificing any of the metal.

I claim:

1. The method of manufacturing draft gear keys which involves the cutting of a plurality of key blanks from a strip of rounded edge metal, each of said blanks being tapered at one end to a width materially less than the width of the strip and provided with triangular spaced extensions at the other end, swaging the tapered end of each blank to finished size, and shaping the extensions thereof at the other end to form enlargements serving as the head of the key.

2. The method of manufacturing draft gear keys which consists in cutting a plurality of key blanks from a strip of rounded edge metal, each of said blanks being tapered at one end for a short distance and then squared across, and provided with tapering extensions at the other end, the tapering of one end of the blank and the forming of said extensions being effected by the same cutting operation, shaping the tapered end to finished size, and upsetting said extensions to provide retaining lugs at the head end of the key.

3. The method of manufacturing a key for railway draft rigging which consists in pointing one end of a relatively flat metal blank and bifurcating the other end thereof, tapering said pointed end to finished size, and upsetting the opposite portions of the bifurcated end of the blank to form retaining lugs.

4. The method of manufacturing keys for railway draft rigging which involves cutting a relatively long and flat bar of metal into key blanks, with the metal of said bar adjacent each cut forming a pointed end on one blank and a bifurcated end on the adjacent blank, and shaping the extensions forming said bifurcated end of each blank to provide the head of the key.

5. The method of manufacturing draft gear keys which consists in cutting a plurality of key blanks from a rounded edge metal bar with the metal adjacent the line of cut arranged to form the point and head ends respectively of the key, and upsetting the metal forming said head ends to provide lateral projections upon opposite sides of the key.

6. The method of manufacturing draft gear keys which consists in cutting with V-like punches a plurality of key blanks from a flat strip of metal so that the metal lying within the V-cut is utilized to form the point end of a key and the metal lying outside and adjacent said V-cut is used to form the head of another key.

7. The method of manufacturing draft gear keys which involves the multiple shearing of a bar of metal to form a plurality of key blanks with the metal adjacent the respective lines of shear arranged for utilization in the forming of the respective ends of the key, and working said metal adjacent each line of shear to form the point and head ends respectively of the adjacent keys.

8. The method of manufacturing draft keys comprising cutting a plurality of key blanks from a strip of round edge metal, tapering one end of said blank for a short distance, leaving a squared portion at the end, and upsetting the corners of the other end thereof to provide retaining lugs for serving as a head for said key.

In testimony whereof I affix my signature

BYERS W. KADEL.